United States Patent [19]

Parks

[11] 4,231,325
[45] Nov. 4, 1980

[54] MODULAR, WASTE COLLECTING AND DRAINING FLOOR APPARATUS

[76] Inventor: Donald M. Parks, R.R. #4, Chillicothe, Mo. 64601

[21] Appl. No.: 46,050

[22] Filed: Jun. 6, 1979

[51] Int. Cl.³ ............................................. A01K 1/01
[52] U.S. Cl. ...................................... 119/28; 52/660
[58] Field of Search ...................... 119/28, 16; 52/660, 52/729

[56] References Cited

U.S. PATENT DOCUMENTS

| | | | |
|---|---|---|---|
| 386,997 | 7/1888 | Logan | 119/28 |
| 428,848 | 5/1890 | Logan | 119/28 |
| 463,244 | 11/1891 | Smith | 119/28 |
| 469,044 | 2/1892 | Jungbluth | 119/28 |
| 487,548 | 12/1892 | Wilbor, Jr. | 119/28 |
| 2,437,210 | 3/1948 | Riebli | 119/28 |
| 3,716,027 | 2/1973 | Vickstrom et al. | 119/28 |
| 3,721,215 | 3/1973 | Vickstrom et al. | 119/28 |
| 3,742,911 | 7/1973 | Lehe et al. | 119/28 |
| 3,815,550 | 6/1974 | Becker | 119/28 |
| 3,848,568 | 11/1974 | Hazen | 119/28 |
| 3,859,962 | 1/1975 | Kissinger, Jr. | 119/28 |
| 4,048,960 | 9/1977 | Barnidge et al. | 119/28 |
| 4,135,339 | 1/1979 | Pawlitschek | 52/660 |

FOREIGN PATENT DOCUMENTS 67062  3/1914  Switzerland ............................. 119/28

Primary Examiner—Hugh R. Chamblee
Attorney, Agent, or Firm—Schmidt, Johnson, Hovey & Williams

[57] ABSTRACT

An improved construction is provided for slotted, waste draining floors such as commonly employed in livestock enclosures. The apparatus employs spaced, parallel, elongate assemblies, which are preferably formed of metal extruded in generally "T" shaped cross-sectional configuration (or in generally "pi" shaped cross-sectional configuration for heavier loads) to present a slotted floor, in combination with slotted waste collection and drainage pipes, which are preferably formed by longitudinal cutting of ordinary plastic pipe, within the chambers between the assemblies. The assemblies and pipes may be made to any desired length, and the modular nature of the construction permits forming a floor of any desired width. An important advantage of the apparatus is that, since it provides for the collection and drainage of waste materials by virtue of its own simple combination of elements, it eliminates the need for an underlying waste collection pit and can be mounted either directly atop a solid sub-floor or in tiered fashion upon elevated support beams without pass through of waste materials to an underlying compartment. A particularly advantageous aspect of the improved floor construction is the manner in which the floor-presenting assemblies and the waste handling pipe or trough elements are mechanically intercoupled to enhance structural strength and stability, as well as the simple and effective way in which that is accomplished.

2 Claims, 5 Drawing Figures

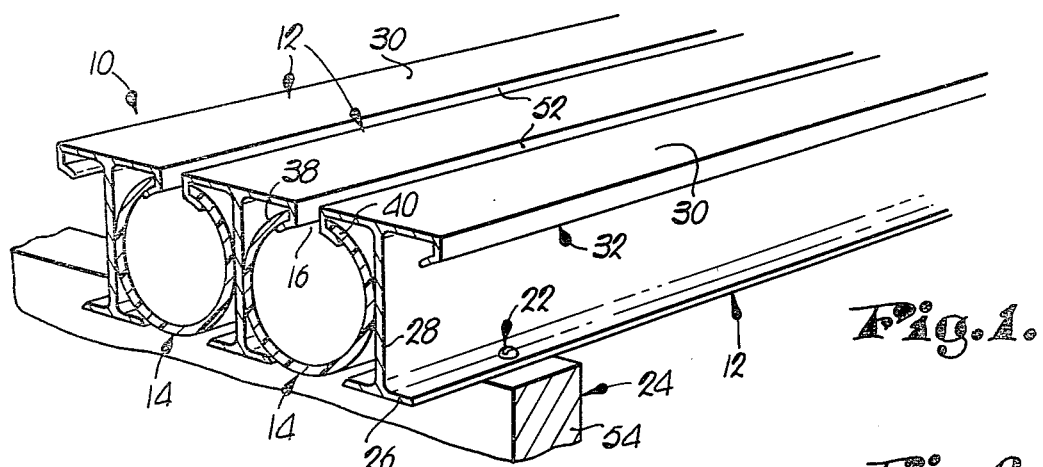
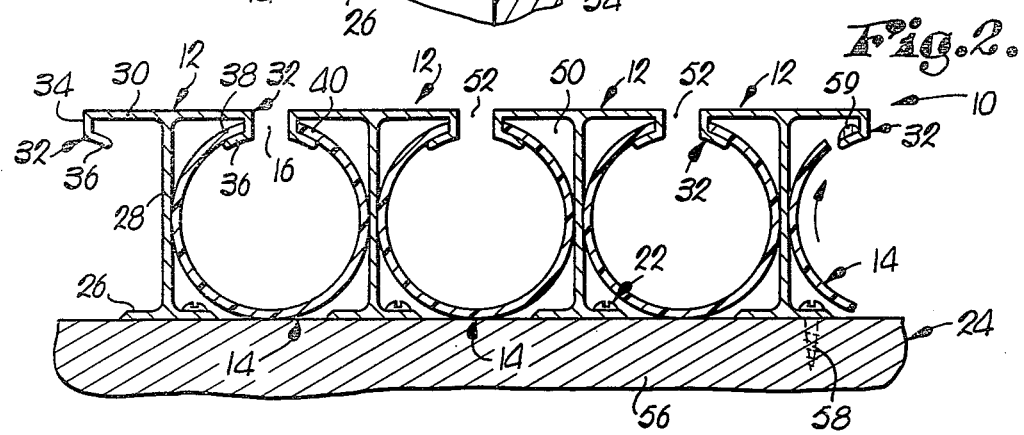
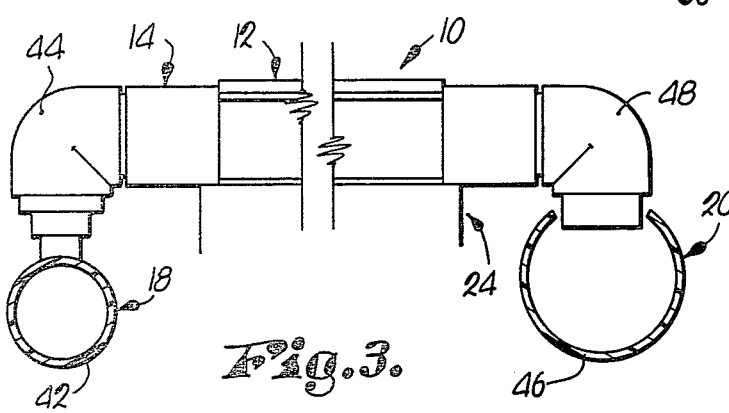
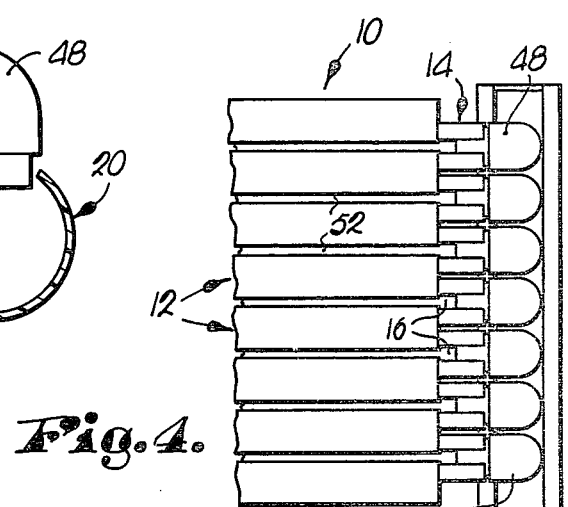
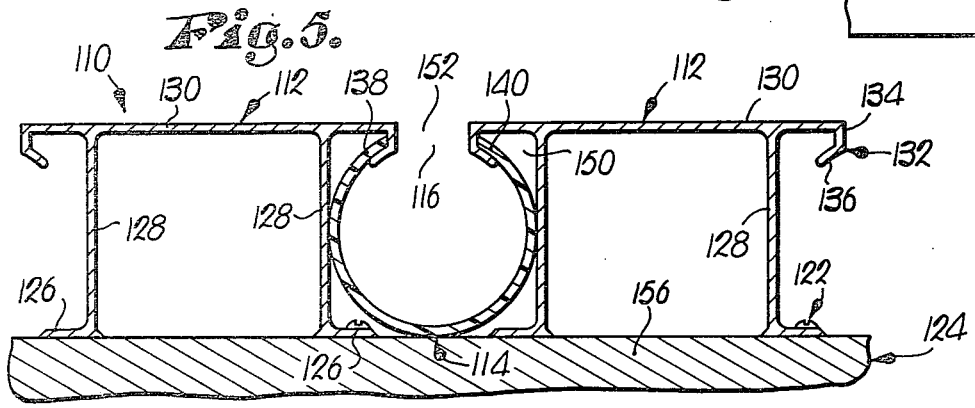

MODULAR, WASTE COLLECTING AND DRAINING FLOOR APPARATUS

BACKGROUND OF THE INVENTION

1. Field of the Invention

This invention relates to an improved construction for waste draining floors of the slotted type and, more particularly, to such apparatus which incorporates as a self-contained part thereof means for collecting and draining waste materials without need for an underlying waste collection pit, thereby permitting installation of the apparatus either directly atop a solid sub-floor or in tiered fashion upon elevated support beams without pass through of waste materials to an underlying compartment.

Although apparatus of the general type involved is most commonly employed in connection with various types of enclosures for livestock (e.g., farrowing pens for hogs), and the invention will be described largely in that context for illustrative purposes, it is contemplated that the improved floor construction provided by the invention may also find important applications in industrial or other environments.

2. Description of the Prior Art

It has long been recognized that inclined sections of animal enclosure floors formed of concrete may be provided with gutters or the like along the lower edge thereof for the collection and drainage of waste materials, as illustrated by U.S. Pat. Nos. 469,044; 487,548; 2,437,210; and 3,859,962. Such installations have a number of disadvantages, however, including the difficulty and cost of construction and the relative inefficiency of such systems in accomplishing the desired removal of waste materials from the floor surface unless the sections of the latter are inclined at an excessive angle for animal occupancy.

U.S. Pat. No. 463,244 is an early example of recognition that slotted floors may be employed in animal enclosures to expedite the natural movement of waste materials from the floor surface into a collecting zone presented by an underlying inclined plate or the like for drainage into a gutter along the lower edge of the plate.

More modern and current practice in slotted floors for animal enclosures has been along lines involving the mounting of the slotted floor upon elevated beams or ledges above a relatively large common waste collection pit therebelow from which waste materials may be periodically removed, as exemplified by U.S. Pat. Nos. 3,716,027; 3,721,215; 3,742,911; 3,815,550; and 4,135,339. It will be noted that such last-mentioned patents exhibit recent interest in improving slotted floors as directed primarily to constructional aspects of the slotted floor forming assemblies per se and various clamp or link means for mounting or interconnecting the same in the type of environment associated with a common collection pit arrangement, rather than to systemic improvement of the over-all installation. Such common collection pit systems suffer from a number of disadvantages including the complexities and cost of construction, the extra height required since the floor must normally be installed sufficiently above the collection pit to permit access to the latter for cleaning, the obvious drawbacks of permitting waste materials to accumulate in a collection pit from which removal is difficult or unpleasant, and the lack of adaptability of the slotted floor constructions employed in such systems for use in tiered fashion since waste materials from an upper enclosure compartment would drop through upon animals in an underlying compartment.

U.S. Pat. No. 4,048,960 discloses details of construction for an apertured floor for animal enclosures employing relatively wide floor-presenting assemblies arranged and interconnected contiguously and including depending support leg panels, with it being unclear whether the latter are intended to be conventionally supported by suitable beams or ledges elevated above a common collection pit or to rest directly upon a sub-floor, although the former of such arrangements is presumed as contemplated since otherwise waste materials would accumulate within the spaces between the support panels from which removal would appear impractical at best.

Other patents with which I am not familiar are referred to in various contexts in certain of those patents mentioned above and may provide relevant additional insight into the history of development of apparatus of the general class with which this invention is concerned.

SUMMARY OF THE INVENTION

This invention is believed to overcome the disadvantages and limitations of previous slotted floor constructions by providing improved modular floor apparatus which requires a minimal number of lightweight and simply configured structural parts that are relatively inexpensive to fabricate and transport, may be easily and quickly installed even by relatively unskilled workmen, and, once installed, is reliable and efficient in operation.

Particular advantages of my improved apparatus include: its incorporation of means for collecting and draining waste materials as a part of the assembled floor unit itself, so that no underlying collection pit is needed, the floor unit may be installed directly atop a solid sub-floor, or the floor units may be arranged in tiered fashion to provide superposed animal compartments without waste materials dropping through from an upper compartment into a lower one; the manner in which the cooperation between the configurations of the floor-presenting assemblies and the waste collecting and draining elements renders the proper placement of such parts during installation virtually automatic; and the manner in which such cooperation between the configurations of such assemblies and elements accomplishes an intercoupling between those parts of the assembled overall floor unit, which greatly enhances its inherent strength and stability and, if desired, will safely permit the employment of constructional materials of lesser individual strengths than would otherwise be required.

My improved construction primarily utilizes a plurality of cross-sectionally generally "T" (or "pi") shaped, elongate assemblies preferably formed of extruded metal and arranged in spaced parallelism to present an elongate waste passage slot between the proximate edges of the upper floor strip portion of each pair of adjacent assemblies and a plurality of elongate, generally cylindrical, pipe-like, trough elements preferably fabricated by cutting from plastic pipe material respectively disposed between each pair of adjacent assemblies and intercoupled with the latter by means of lateral mutual engagement and depending flanges on the edges of the floor strip portions of the assemblies extending into an elongate opening along the top of each element through which waste material may pass through the corresponding slot of the floor surface into such trough element. Suitable means for introducing flushing water into one end of the trough elements and for carrying away waste material from the other end thereof is preferably provided. If desired, the assemblies and troughs may be moderately inclined to further enhance drainage.

BRIEF DESCRIPTION OF THE DRAWING

In the drawing:

FIG. 1 is a fragmentary perspective view, with proximate end parts broken away and shown in section, of a portion of a floor constructed in accordance with my currently preferred embodiment of the invention, illustrating the same as being supported on transverse beam means;

FIG. 2 is a fragmentary transverse cross-sectional view of a portion of the same embodiment of floor as shown in FIG. 1, but illustrating the advantageous adaptability of same for mounting directly atop a solid sub-floor;

FIG. 3 is a fragmentary side elevational view showing the relationship between the ends of one of the waste collecting and draining pipe elements of the floor and the flushing water manifold and the carry-off conduit respectively associated with such ends;

FIG. 4 is a fragmentary top plan view further showing the relationship of the carry-off conduit to one end of the collecting and draining pipe elements; and FIG. 5 is a fragmentary transverse cross-sectional view similar to FIG. 2, but showing a modified embodiment of the invention adapted to accommodate larger weight loads on the floor.

DESCRIPTION OF THE PREFERRED EMBODIMENTS

Referring initially to FIGS. 1-4 inclusive of the drawing, my currently preferred embodiment of the improved floor apparatus provided by the invention for use with typical weight loads, such as in an enclosure for hogs, is designated by the numeral 10.

The apparatus 10 broadly includes a plurality of identical, elongate, generally "T" shaped, floor-presenting assemblies 12; a plurality of identical, elongate, generally cylindrical, pipe-like, waste collecting and draining, trough elements 14 each having a longitudinal opening 16 along the top thereof; a flushing water manifold 18 coupled with one end of each of the trough elements 14; a carry away trough 20 for receiving waste materials from the other end of the elements 14 and draining the same to a disposal or collection area as hereinafter further discussed; and suitable fastening means 22 for securing each of the assemblies to any appropriate underlying support means 24.

Each of the assemblies 12 is preferably formed by extrusion from aluminum or a suitable alloy as a unitary part of virtually any desired length that would be appropriate for an animal enclosure or the like, although certain plastic or other materials and constructions other than extrusions might also be used. Each assembly 12 integrally includes a base portion 26, an upstanding web structure 28 rising from the base portion 26, a floor strip portion 30 upon the web structure 28 and extending laterally in both directions therefrom, and a flange 32 depending from each lateral edge of each strip portion 30 and including an initial downwardly extending part 34 and a terminal part 36 extending back toward the web structure 28. In the preferred construction in which the assemblies 12 are fabricated by extrusion, the various portions 26, 28, 30 and 32 (34 and 36) thereof would be coextensive in length with the assembly 12 of which they form a part although those skilled in the art will appreciate that, for example, the flanges 32 could be formed in shorter sections spaced along the length of the strip portions 30. Although the cross-sectional dimensioning of the assemblies is not particularly critical, other than to maintain the desired correlation with the dimensioning of the trough elements 14 to maintain a desired waste passing slot width while accomplishing the intercoupling relationships hereinafter further discussed, it is noted that, for typical installations in hog enclosures or the like, wall thickness may be about 1/10 inch, the base portions 26 may be about $1-1\frac{1}{2}$ inches wide, the web structures 28 may be about $2\frac{1}{4}-3$ inches high, and the strip portions may be about $2-2\frac{3}{4}$ inches wide, depending of course upon the outer diameter of the rough elements 14 and the width of the spacing between adjacent strip portions 30 that are to be employed.

Each of the trough elements 14 is preferably formed from ordinary plastic pipe of PVC material or the like by cutting away a longitudinal strip thereof to provide an opening 16 along the top thereof of desired width for the passage of waste materials therethrough into the element 14, which width may typically be in the range of about $\frac{1}{2}-1$ inch for a hog enclosure, depending on the size of the animals to be handled. As will be apparent to those skilled in the art, the elements 14 could be formed by other methods, such as by extruding the same directly in their desired final configuration, and they might also be formed of materials other than plastic, although it is regarded as of significance to the practice of the invention in its most preferred context that the elements 14 be so fabricated as to possess sufficient resiliency that the marginal edge portions 38 and 40 bordering the opening 16 will tend to move back toward a normal spacing therebetween when spread away from that position. The elements 14 preferably are slightly longer than the assemblies 12, so as to extend from each end of the latter sufficiently to facilitate the association therewith of the flushing water manifold 18 and the carry away trough 20; and, for a typical hog enclosure, although such dimensions are not of themselves particularly critical, the elements 14 suitably may have an inner diameter of about $2-2\frac{1}{2}$ inches with a wall thickness of about $3/16-\frac{1}{4}$ inch.

Although the details of the flushing water manifold may be varied, the preferred construction chosen for illustrative purposes in FIG. 3 involves a distribution pipe 42 coupled through an elbow fitting 44 with one end of each of the trough elements 14. Flushing water is supplied to the pipe 42, in any suitable fashion either continuously or intermittently, in such quantity and under only such pressure as required to provide the desired flow into each of the trough elements 14 for adequately urging waste materials toward the opposite end of the elements 14. Although the amount of flushing desired may vary from installation to installation, a flow of about 4 gallons per minute per element 14 should suffice for a typical hog enclosure.

Similarly, the details of the carry away trough arrangement 20 at the opposite end of the elements 14 may be varied, but the preferred construction shown for illustrative purposes in FIGS. 3 and 4 utilizes an inclined trough pipe 46, which is open along its top and may be formed from ordinary plastic pipe of suitable diameter to handle the quantity of flushing water and waste materials for the particular installation, together with a down-discharging elbow fitting 48 for directing material from that end of each of the elements 14 into the pipe 46.

Although any suitable source of flushing water may be used and the discharge from the carry away trough 20 simply delivered into a sewer or the like, considerations of conservation render preferable an arrangement in which the discharge from the carry away trough 20 is delivered by gravity flow (or even by pumping, if necessary) to a settling lagoon of sufficient size that the solid content of the waste material may separate out and be decomposed and the water content may be adequately purified for reuse as flushing water through natural processes, and in which the required flushing water is derived from a purified portion of the same pond and simply pumped to the manifold 18, thereby recycling the flushing water. It will also be appreciated, of course, that one willing to forego the convenience and efficiency of employing the manifold 18 and an automatic or at least centrally controlled flushing water system could, without departing from the primary aspects of the invention, simply introduce flushing water into the elements 14 manually and individually by means of a hose or the like when desired. With the type of flushing system suggested, however, the elements 14 are largely self-cleaning and the additional effort that may be required to satisfy sanitation requirements for the installation as a whole will be substantially minimized.

Attention is next redirected to the improved floor construction itself, with particular reference to the advantageous relationships between its parts when assembled. As will be seen from FIGS. 1 and 2, when the floor 10 is assembled, the assemblies 12 are arranged in spaced parallelism with each other to provide a chamber 50 between each pair of adjacent assemblies 12 for receiving a corresponding one of the trough elements 14. The dimensioning of the assemblies 12 and the elements 14 and the spacing between adjacent assemblies 12 are so selected and correlated that a waste passing slot 52 of the desired width will be presented between the proximate edges of each pair of adjacent assemblies 12, the bottom surface of the elements 14 will be supportingly engaged by the underlying support means 24, the sides of each element 14 will laterally engage the web structures 28 of the adjacent assemblies 12 to help maintain the desired spacing of the latter, and the marginal portions 38 and 40 bounding the opening 16 of each element 14 will be nested within the cavity presented by the flange 32 of the corresponding assemblies 14 and resiliently engaging the portions 34 of such flanges 32 to help hold the individual assemblies 14 against tilting or otherwise moving apart.

It should be appreciated that the last-mentioned novel interrelationship of parts provides a mechanical intercoupling between the assemblies 12 and the elements 14 such that the strength and stability of the overall floor is greatly enhanced, with the elements 14 thus contributing to the desirable structural characteristics of the floor as well as performing their waste collecting and draining function. It should also be appreciated that such intercoupling relationships between the assemblies 12 and the elements 14 tend to minimize the extent of securement that is really required for mounting the improved floor 10 upon underlying support means 24. It should further be observed not only that the relatively modest thickness of the improved floor 10 is conserving of vertical space, but that its incorporation of the waste collecting elements 14 within such thickness permits the floor 10 to be mounted, with equal facility and freedom from drop through of waste material, either upon support means 24 in the nature of possibly elevated cross beams 54 as illustrated in FIG. 1 or directly upon a solid sub-floor 56 as illustrated in FIG. 2.

The construction of the improved floor 10 also simplifies and expedites installation in ways that may not be apparent without considering the steps involved. The recommended installation procedure commences with laying the assembly 12 which will be at one side of the completed floor 10 in place on the support means 24 and securing it to the latter by any suitable fastening means 22, such as ordinary screws 58; then the first trough element 14 is laid in place upon the support means 24 with its marginal portion 38 emplaced within the cavity presented by the flange 32 of the first assembly 12; then the flange 32 of the next assembly 12 is "hooked" into the opening 16 of the first element 14 with the marginal portion 40 of the latter received within the cavity presented by the flange 32 of such next assembly 12; such next assembly 12 is then tilted into its upright condition with its web structure 28 laterally engaging the element 14 and its flange 32 exerting firm contact against the resilience of the marginal portion 40 of the element 14, whereupon such next assembly 12 is suitably secured to the support means 24; and such cycle is repeated until a floor 10 of the desired width has been assembled. Although it appears likely unessential for many typical installations, particularly when a good resiliency contact is made during installation, my preferred construction also contemplates that a bead of suitable bonding material, as shown at 59 in FIG. 2, may be emplaced during installation in the cavity presented by each flange 32 for forming a sealing connection between the flanges 32 and the marginal portions 38 and 40 of the elements 14. As previously mentioned, a modest downward inclining of the floor 10 in the direction of flow through the elements 14 may desirably enhance the drainage action of the latter, particularly when intermittent flushing is to be employed and it is desired that the elements 14 shall discharge essentially all liquid therefrom into the carry away trough 20 between flushings; this may be provided for in the course of orienting the floor 10 over a suitably inclined existing sub-floor 56 or during the construction of the latter or by employing relatively thin beams 54 of varying thickness as shims between a level sub-floor 56 and the floor 10 or, where regular cross beams 54 are to be employed anyway, by appropriately locating the same to provide the desired incline, it being noted that about ½ inch of drop per 10 feet of length of the floor 10 will be found adequate for most installations and will be insufficient to bother the animals.

Although proper correlation of the dimensions to be selected for any particular type of installation would appear to involve only routine design involving simple arithmetic, it may be noted that the outer diameter of the elements 14 (less an appropriate allowance for the decreased height of the elements 14 due to the openings 16) will essentially determine the height needed in the assemblies 12 from the support means 24 to the lower surface of the floor strip portion defining the upper wall of the cavity presented by the flange 32, and that the width of the floor strip portions 30 should then be selected to provide the desired lateral engagement between the elements 14 and the web structures 28 and the desired width for the slots 52 in the light of the width chosen for the openings 16 in the elements 14.

Reference is next made to FIG. 5, which illustrates a modified form of the invention that is preferred for floor installations expected to handle heavier loads or where wider floor strips are desired, such as in an enclosure for cattle. The floor apparatus of FIG. 5 is generally identified by the reference numeral 110, and, since the apparatus 110 differs from the apparatus 10 essentially only as to cross-sectional configuration and dimensioning, various parts of the apparatus 110 which are otherwise essentially analagous to the corresponding parts of the apparatus 10 are simply labelled with reference numerals that are greater by 100 than those applied to the corresponding parts of the latter.

In the apparatus 110, the inner diameter of the elements 114 will typically be increased to whatever size might be required for the particular application and the correlated dimensions of the assemblies 112 chosen accordingly. In particular, however, the overall width of the floor strip portion 130 of the assemblies 114 may be increased as required to properly accommodate the animals to be handled, since only the lateral overhang thereof need be correlated with the dimensioning of the elements 114. Any substantial increase in the width of the floor strip portions 130 renders it desirable, unless the wall thickness of assemblies 112 is to be substantially increased, that additional support from beneath be provided for the assemblies 112. Accordingly, in the apparatus 110, instead of a single web structure 28 and base 26 as in the apparatus 10, there are provided a pair of laterally spaced, parallel web structures 128 each having an associated base 126, which constitutes the primary configurational difference of the apparatus 110 from the apparatus 10 and gives the apparatus 110 a generally "pi" shaped transverse cross-sectional configuration, as compared with the generally "T" shaped, cross-sectional form of the apparatus 10. It will be apparent to those skilled in the art that, if the width of the strip portion 130 was to be sufficiently increased, it would be feasible to add an even further web structure 128 intermediate those illustrated in FIG. 5. It may be further observed that, by virtue of the intercoupled relationships between the assemblies 112 and the elements 114, it will in most installations be necessary to secure only one base portion 126 of each assembly 112 to the underlying support means 156 by screws or the like 122. The fabrication, assembly and functioning of the apparatus 110 is otherwise essentially similar to that heretofore described for the apparatus 110 and would appear not to require reiteration.

It is believed that both of the embodiments of the invention disclosed for illustrative purposes will be recognized by those skilled in the art as providing slotted floor apparatus which is substantially improved over what has heretofore been known and available. It will also be apparent, however, that various modifications and changes in details of construction from those herein disclosed to illustrate the principals and substances of the invention could be made without departing from the gist of the invention as herein illustrated and described. Accordingly, it should be understood that the invention is intended to be limited only by the scope of the claims which follow and to extend to the subject matter of the latter and mechanical equivalents thereof.

I claim:

1. In modular, waste collecting and draining, floor apparatus adapted for installation upon underlying support means of various types, including those of type involving a directly underlying sub-floor:

a plurality of elongate assemblies each having a base, structure rising from said base, and a floor strip supported above said base by said structure;

means for mounting said assemblies upon said underlying support means with said assemblies in spaced, generally parallel relationship to each other to present an elongate chamber between said structures of each adjacent pair of assemblies and with the adjacent edges of each adjacent pair of said strips in spaced, generally parallel relationship to each other to present an elongate slot between each of said pairs of adjacent edges in communication with the corresponding of said chambers; and a plurality of trough means respectively disposed within said chambers and each in communication with the corresponding of said slots for receiving and draining away waste materials passing downwardly through said slots between said strips;

each of said trough means comprising an elongate, generally cylindrical pipe-like element resting upon said underlying support means, oppositely engaging said structures of the adjacent assemblies and having an elongate opening along its upper surface in communication with the corresponding of said slots, each of said strips being provided with flange means depending from the edges thereof and extending into said opening of the corresponsing of said elements whereby said flange means operate to maintain said openings in communication with said slots and said elements operate to couple said assemblies in their said relationships.

2. The invention of claim 1, wherein:

said elements are circumferentially resilient, and the width of said openings is normally no greater than the spacing between the corresponding pair of said flange means for further holding said assemblies in their said relationship and said elements in operative disposition within said chambers with said openings in aligned communication with said slots.

* * * * *